Feb. 20, 1934.  P. D. HARVEY  1,947,847

REVERSE GEAR UNIT

Original Filed Jan. 5, 1931

Witness:
William P. Kilroy

Inventor:
Paul D. Harvey
By Wm. B. Belt
Atty.

Patented Feb. 20, 1934

1,947,847

UNITED STATES PATENT OFFICE 1,947,847

REVERSE GEAR UNIT

Paul D. Harvey, Chicago, Ill.

Original application January 5, 1931, Serial No. 506,774. Divided and this application February 10, 1932. Serial No. 592,049

4 Claims. (Cl. 74—58)

This application is a division of my application, Serial No. 506,774, filed January 5, 1931.

This invention relates to certain novel improvements in reverse gear units of the kind particularly adapted for use in marine craft such as motor boats, motor launches and the like of the type propelled by internal combustion engines or similar motive power.

The propeller or screw used to propel a marine craft continues to rotate even after it is disconnected from the driving means therefor because the movement of the craft causes the water to act on the screw to bring about rotation thereof and if the craft has been moving forwardly the action of the water is such that it tends to cause rotation of the screw in a forward direction. Maneuvering of a marine craft is facilitated if it can be reversed, and this also facilitates stopping of the craft. But inasmuch as the screw is rotating in a forward direction the drive shaft therefor is similarly rotating and if an endeavor is made to engage a driving gear, operating in a direction to cause reverse rotation of the screw, with a gear on the screw shaft, a clash occurs. This condition sometimes arises in vehicles and the intermeshing of gears to cause rotation of a shaft in a direction opposite to that in which it has been rotating is greatly facilitated if clashing of the gears is eliminated. It is therefore one of the objects of my invention to provide a unit embodying a driven shaft and to reverse the rotation of this driven shaft in such a way that clashing of the gears to be connected to bring about a reversal of the direction of rotation of the driven shaft is eliminated.

Further objects are to provide a novel reversing mechanism of economical manufacture and of compact design; to provide a novel reversing mechanism wherein a driving and a driven shaft are provided and to so arrange the devices transmitting movement from the driving shaft to the driven shaft that the driven shaft may be entirely disconnected from the driving shaft; to employ an internal gear in the devices transmitting motion from the driving shaft to the driven shaft; and to provide a clutch for absorbing the shock incident to the interconnection of the driven shaft to the driving shaft to cause rotation of the driven shaft in a direction opposite to that in which it has been operating.

Figure 1:
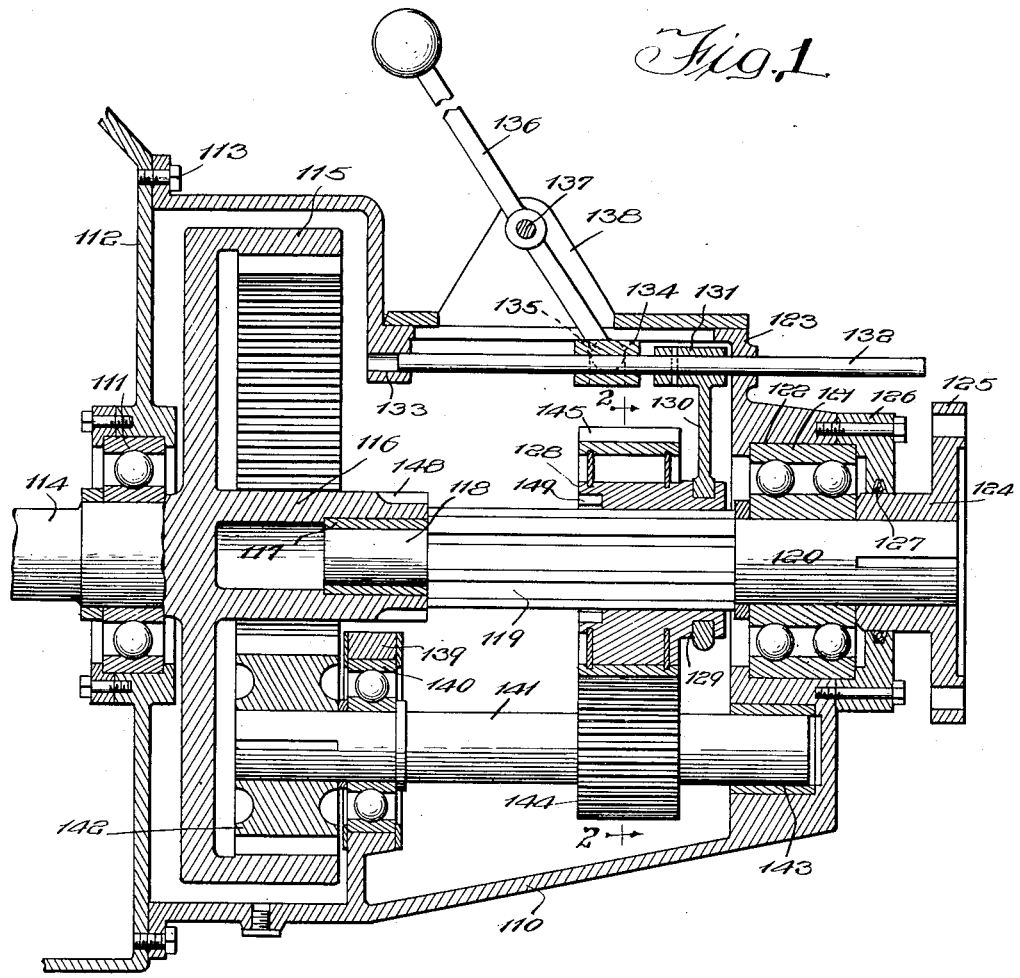
Figure 2:
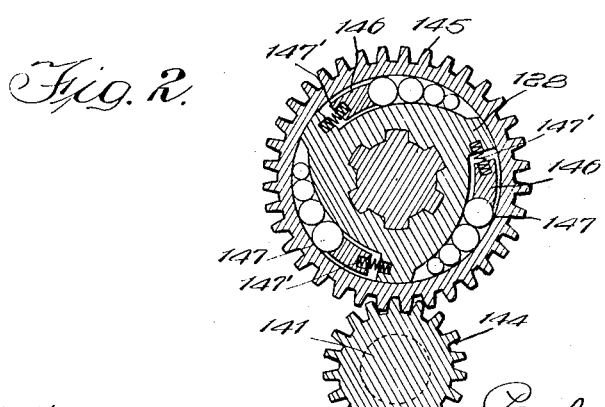

In the selected embodiment of the invention illustrated in the accompanying drawing Fig. 1 is a vertical longitudinal sectional view of a reversing unit embodying one form of my invention; and Fig. 2 is a sectional view taken substantially on the line 2—2 on Fig. 1.

In the embodiment of the invention illustrated in the accompanying drawing, 110 indicates the housing of my improved reversing unit and 111 indicates an anti-friction bearing retained in an opening in the front wall 112 of the housing. An outwardly projecting marginal flange is provided on the housing 110 at the end thereof closed by the wall 112 and bolts 113 are passed through this flange to secure the housing to the wall, and the wall 112 not only serves as a front wall for the housing but likewise serves as the rear wall of a clutch housing or the like wherein a power supply device is arranged and to which power supply device the driving shaft 114, journaled in the bearing 111, is connected. On the shaft 114 inwardly of the wall 112 is an internal gear 115 and projecting from the web connecting the gear 115 to the shaft 114 and in alignment with the shaft is a sleeve 116 having a bearing bushing 117 therein. The reduced end portion 118 at one end of the spline shaft 119 is journaled in the bushing 117 and the reduced portion 120 of the spline shaft at the other end of the spline shaft is journaled in an anti-friction bearing 121 mounted in the flanged opening 122 in the rear wall 123 of the housing 110. Keyed to the reduced end portion 120 is the hub 124 of a coupling flange 125 that is adapted to be connected to the device to be operated which, for example, may be the shaft of the propeller of a marine craft or which may be the drive shaft of a vehicle. A bearing retainer 126 has a packing gland 127 therein to prevent leakage into or from the interior of the housing 110 and this bearing retainer holds the bearing 121 in position. Slidably mounted on the spline shaft 119 is a sleeve 128 having a peripheral groove 129 adjacent one end thereof in which a yoke 130 is engaged. The yoke 130 includes a bearing 131 pinned to a slide rod 132 slidably mounted in a bearing in the rear wall 123 and in a bearing 133 depending from the top wall of the housing 110. Fast on the slide rod 132 is a collar 134 and pivotally connected to the collar at 135 is the lower end of an operating lever 136 which is extended through an opening in the top wall of the housing 110 and which is pivotally mounted at 137 on a bracket 138 carried by the top wall of said housing. By pivoting the lever 136 about the pivotal mounting 137 therefore the slide rod 132 is slid through the bearings in which it is journaled and this movement is transmitted through the yoke 130 to the sleeve 128 to slide said sleeve along the spline shaft 119.

Extending upwardly from the lower wall of the housing 110 is a bracket 139 having an anti-friction bearing 140 therein in which a counter-shaft 141 is journaled, said counter-shaft extending through said bearing and having a gear 142 keyed thereto, and this gear meshes with the internal gear 115. The shaft 141 is also journaled in a bearing 143 in the housing 110. Mounted on the counter-shaft 141 adjacent the bearing 143 is a pinion 144 which meshes with a gear 145 disposed about the sleeve 128 and connected to the sleeve for movement therewith as said sleeve is slid along the spline shaft. An overrunning clutch is provided to interconnect the gear 145 to the sleeve 128 so that the gear will rotate with the sleeve in one direction and so that the sleeve will rotate relative to the gear in the other direction without imparting movement to said gear. To provide the overrunning clutch I form notches 146 in the periphery of the sleeve at the portion thereof surrounded by the gear 145 and these notches are deeper at one end than at the other. A plurality of graduated rollers 147 are mounted in the notches 146 and a follower is engaged with the largest of the rollers and is acted on by a spring 147 to urge the rollers toward the shallower ends of the notches and when the rollers are in the shallower ends a wedging action occurs which interconnects the gear 145 to the sleeve 128. In a manner to be described, the spline shaft 119 is rotated in one direction and this movement is transmitted to the coupling flange 125 whereby the device connected thereto is rotated in one direction. However, when it is desired to reverse the direction of rotation of the coupling flange 125 to thereby rotate it in the opposite direction, the handle 136 is manipulated to slide the sleeve 128 along the spline shaft 127 until the gear 145 meshes with the pinion 144. So long as rotation is transmitted through the shaft 114 the pinion 144 is rotating, for rotation is imparted from the internal gear 115 through the gear 142 to the shaft 141. Since an overrunning clutch is provided between the gear 145 and the sleeve 128 the gears 141 and 145 will mesh without clashing. However, at the time the gear 145 is meshed with the pinion 144 the sleeve 128 is rotating with the spline shaft 119 in a direction opposite to that in which said spline shaft will be rotated when movement is imparted from the pinion 144. Hence, as soon as the pinion 144 starts to rotate the gear 145, the springs 147' are enabled to force the rollers 147 into the shallower portions of the notches 146 whereupon the sleeve 128 is connected to the gear 145 and hence movement is then transmitted to the spline shaft 119 in a direction opposite to that in which it has been rotating for the device is so arranged that at the time the pinion 144 is meshed with the gear 145, the drive connection between the spline shaft and the device supplying rotative movement thereto will have been broken. Inasmuch as the overrunning clutch does not operate to connect the gear 145 until subsequent to the meshing of said gear with the pinion 144, it is manifest that the shock incident to the reversal of the direction of rotation of the spline shaft 119 is absorbed in the clutch.

A convenient way of rotating the spline shaft 119 in the direction opposite to that in which it is operated at the time the overrunning clutch is engaged is to provide gear teeth 148 on the periphery of the sleeve 116 at the inner end thereof. In the adjacent end of the sleeve 128 internal gear teeth 149 are provided. By manipulating the lever 136 the sleeve 128 is slid along the spline shaft 119 to disengage the gear 145 from the pinion 144 and by continuing movement of the sleeve in this direction the teeth 149 are meshed with the teeth 148 whereby the spline shaft is directly connected to the driving shaft 114 and hence the spline shaft rotates with the driving shaft. When, however, the sleeve 128 is moved along the spline shaft 119 to mesh the gear 145 with the pinion 144, the teeth 149 disengage the teeth 148 prior to the engagement of the teeth of the gear 145 with the pinion 144. A suitable lubricant is stored in the housing 110 to lubricate the bearings and gears for the purpose well understood in the art.

It is manifest from the foregoing description that I have provided a reversing device wherein the gears adapted to bring about rotation in a reverse direction to that in which the driven shaft has been rotating may be meshed without clashing and furthermore the shock incident to the reversal of direction of the rotation of the driven shaft is absorbed by a clutch. By the use of an internal gear I am enabled to provide a compact reverse gear unit.

While I have illustrated and described a selected embodiment of my invention it is to be understood that this is capable of variation and modification and I therefore do not wish to be limited to the precise details set forth but desire to avail myself of such changes and alterations as fall within the purview of the following claims.

I claim:

1. In a device of the class described, a drive shaft having an internal gear thereon and including a sleeve portion having connecting means thereon, a driven shaft, a member having a gear thereon and splined to said driven shaft, said member having connecting means thereon, a counter-shaft having a gear thereon adapted to be meshed with the gear on said member, another gear on said counter-shaft and meshed with said internal gear, and means for moving said member along said driven shaft to engage the connecting means thereon with the connecting means on the sleeve or to mesh the gear thereon with the first-named gear on said counter-shaft to operate said driven shaft from said drive shaft in opposite directions or to disconnect said shafts from each other.

2. In a device of the class described, a drive shaft having an internal gear thereon and including a sleeve portion having connecting means thereon, a driven shaft, a member splined to said driven shaft, said member having connecting means thereon, a counter-shaft having a gear thereon, another gear on said counter-shaft and meshed with said internal gear, a ring surrounding said member and having gear teeth thereon, shock absorbing means for connecting said ring to said member, and means for moving said member along said driven shaft to engage the connecting means thereon with the connecting means on the sleeve or to mesh the gear teeth on said ring with the first-named gear on said counter-shaft to operate said driven shaft from said drive shaft in opposite directions or to disconnect said shafts from each other.

3. In a device of the class described, a drive shaft having an internal gear thereon and including a sleeve portion axially aligned with said drive shaft and having teeth thereon at the free end thereof and providing a bearing, a driven shaft having one end thereof journaled in said bearing, a member having a gear thereon and splined to said driven shaft, said member having teeth therein in the side thereof, a counter-shaft having a gear thereon adapted to be meshed with the gear on said member, another gear on said counter-shaft and meshed with said internal gear, a hub on said member, a yoke engaging said hub, and means for moving said yoke to slide said member along said driven shaft to engage the teeth in the side thereof with the teeth on said sleeve or to mesh the gear thereon with the first-named gear on said counter-shaft to operate said driven shaft from said drive shaft in opposite directions or to disconnect said shafts from each other.

4. In a device of the class described, a drive shaft having an internal gear thereon and including a sleeve portion axially aligned with the drive shaft and having teeth thereon at the free end thereof and providing a bearing, a driven shaft having one end thereof journaled in said bearing, a member splined to said driven shaft and having teeth in the side thereof, a counter-shaft having a gear thereon, another gear on said counter-shaft and meshed with said internal gear, a ring surrounding said member and having gear teeth thereon, shock absorbing means for connecting said ring to said member, a hub on said member, a yoke engaging said hub, and means for moving said yoke to slide said member along said driven shaft to engage the teeth in the side thereof with the teeth on said sleeve or to mesh the gear teeth on said ring with the first-named gear on said counter-shaft to operate said driven shaft from said drive shaft in opposite directions or to disconnect said shafts from each other.

PAUL D. HARVEY.